(12) United States Patent
McGowan et al.

(10) Patent No.: US 8,326,912 B2
(45) Date of Patent: Dec. 4, 2012

(54) PIPELINING FOR MASSIVELY PARALLEL SERVICE ARCHITECTURE

(75) Inventors: Albert J. McGowan, Phoenix, AZ (US); Richard L. Carls, Scottsdale, AZ (US)

(73) Assignee: Unicorn Media, Inc., Tempe, AZ (US)

( * ) Notice: Subject to any disclaimer, the term of this patent is extended or adjusted under 35 U.S.C. 154(b) by 79 days.

(21) Appl. No.: 13/047,622

(22) Filed: Mar. 14, 2011

(65) Prior Publication Data

US 2012/0066285 A1  Mar. 15, 2012

(30) Foreign Application Priority Data

Aug. 12, 2010  (AU) ................................ 2010212287

(51) Int. Cl.
*G06F 15/16* (2006.01)
(52) U.S. Cl. ........ 709/201; 709/202; 709/203; 709/204; 709/205
(58) Field of Classification Search ............... 709/201, 709/202, 203, 204, 205
See application file for complete search history.

(56) References Cited

U.S. PATENT DOCUMENTS

| | | | |
|---|---|---|---|
| 6,314,425 B1 * | 11/2001 | Serbinis et al. ........................ 1/1 |
| 6,584,466 B1 * | 6/2003 | Serbinis et al. ................ 715/209 |
| 7,082,475 B2 * | 7/2006 | Haverstock et al. ........... 709/246 |
| 7,181,523 B2 * | 2/2007 | Sim ................................. 709/226 |
| 7,778,717 B2 * | 8/2010 | Bachman et al. ................. 700/83 |
| 2003/0158913 A1 | 8/2003 | Agnoli et al. |
| 2004/0117427 A1 * | 6/2004 | Allen et al. .................... 709/200 |
| 2006/0224681 A1 * | 10/2006 | Wurster ......................... 709/206 |
| 2009/0327465 A1 * | 12/2009 | Flegg et al. .................... 709/223 |
| 2010/0250682 A1 * | 9/2010 | Goldberg et al. ............. 709/206 |
| 2010/0293136 A1 * | 11/2010 | Watanabe ..................... 707/608 |
| 2011/0093538 A1 * | 4/2011 | Weir et al. ..................... 709/205 |

FOREIGN PATENT DOCUMENTS

WO   WO 01/77841 A2   10/2001

OTHER PUBLICATIONS

Australian Patent Office, Examiner's Fifth Report on Patent Application 2010212287 by Unicorn Media, Inc., dated Nov. 17, 2011, 3 pages.
Australian Patent Office, Examiner's First Report on Patent Application 2010212287 by Unicorn Media, Inc., dated Sep. 24, 2010, 4 pages.
Australian Patent Office, Examiner's Second Report on Patent Application 2010212287 by Unicorn Media, Inc., dated Feb. 15, 2011, 4 pages.

(Continued)

*Primary Examiner* — Liangche A Wang
(74) *Attorney, Agent, or Firm* — Kilpatrick Townsend & Stockton LLP

(57) ABSTRACT

Various systems and methods are described that may allow a server to control various other servers performing services on media assets, such as a video file, which may need to be encoded then copied to a plurality of servers. A first server may be aware of what service needs to be performed on a media asset next. The first server may then notify a second server that this service is to be performed. Once the service has been performed on the media asset, the first server may be notified that the service has been completed. The first server may then determine which, if any, other service needs to be performed on the media asset. The first server may determine and instruct other servers on what services to perform for large numbers of other media assets while the media asset is having a service processed using it.

15 Claims, 12 Drawing Sheets

OTHER PUBLICATIONS

Australian Patent Office, Examiner's Third Report on Patent Application 2010212287 by Unicorn Media, Inc., dated May 16, 2011, 3 pages.

Australian Patent Office, Examiner's Fourth Report on Patent Application 2010212287 by Unicorn Media, Inc., dated Aug. 2, 2011, 2 pages.

* cited by examiner

PIPELINING FOR MASSIVELY PARALLEL SERVICE ARCHITECTURE

BACKGROUND OF THE INVENTION

This disclosure is related in general to cloud-based processing, and, but not by way of limitation, to parallel processing of multiple services by multiple computing devices.

In some computer systems, processing may be linear. In such systems, before a second process begins, the entirety of a first process may need to be completed. Take for example the transcoding and transfer of large media files. If a computer system is transcoding (e.g., converting media files from one format to another) and transferring a number of large media files, the process may involve several steps, such as: 1) transcode the first file; 2) transfer the first file; 3) transcode the second file; and 4) transfer the second file. This process may continue for every how many files need to be transcoded and transferred. Further, a step may not be performed until the previous step has finished in its entirety. In this example, the transcoding of the second file may not begin until the first file has been completely transferred.

Such a process may result in significant inefficiencies. For example, if it takes a significant amount of time to transfer the first file (perhaps due to the size of the file, network congestion, or some other factor), processing resources may sit idle and the amount of time to complete the process of transcoding and transferring may be high.

BRIEF SUMMARY OF THE INVENTION

In some embodiments, a content processing system for performing processing of multiple services using a media asset is present. The content processing system may include a first server system. The first server system may be configured to receive a notification from a second server system, wherein the notification is linked to the media asset, determine a second service to be processed using the media asset, wherein: the second service is at least partially determined by the first server system using a workflow script and a task; and the workflow script comprises a plurality of tasks; the task is part of the plurality of tasks; each task of the plurality of tasks identifies one or more services to be processed using media assets; the task of the plurality of tasks of the workflow script indicates that the second service is to be processed using the media asset; determine a third server system to process the second service, and notify the third server system to process the second service, wherein: the notification indicates that the second server system has processed a first service using the media asset. The content processing system may include the second server system, which is configured to: perform the first service, and send the notification to the first server system that indicates when the first service using the media asset is complete. The content processing system may also include a third server system configured to process a second service using the media asset and notify the first server system when the second service has been processed.

In some embodiments, the first service is a transcoding service that converts the media asset from a first format to a second format. In some embodiments, the second service is a file replication service that transfers a copy of the media asset to a fourth server system. In some embodiments, the fourth server system is a content delivery network. In some embodiments, the first server system, second server system, and third server system are three physically distinct server systems. In some embodiments, the second server is configured to process only the first service; the third server is configured to process only the second service; and the first service and the second service are different services. In some embodiments, the first server is configured to perform additional determinations and notifications linked to other media assets while the third server is processing the second service using the media asset. In some embodiments, the third server system is comprised of multiple servers and a master server, the third server system is further configured to: receive, by the master server, the notification from the first server; receive, by the master server, statuses from at least some of the multiple servers; and determine, by the master server, at least partially based on the statuses received from at least some of the multiple servers, which of the multiple servers will process the second service using the media asset. In some embodiments, each of the multiple servers of the third server system has a queue configured to determine an order of media assets on which to perform the second service.

In some embodiments, a method for processing multiple services using a media asset is described. The method may include receiving, at a first server, a notification, wherein: the notification indicates that a first service processed using the media asset has been completed by a second server, and the performance of the first service results in a processed media asset being created. The method may include determining, by the first server, a second service to be processed using the processed media asset, wherein: the second service is at least partially determined by the first server using a workflow script and a task; and the workflow script comprises a plurality of tasks; each of the plurality of tasks identifies one or more services to be processed using media assets; the task, of the plurality of tasks, indicates that the second service is to be processed using the processed media asset. The method may include transmitting, by the first server, a notification to a third server responsible for processing the third service using the processed media asset, wherein the notification indicates that the second service is to be processed using the processed media asset. The method may further include receiving, by the third server, the notification transmitted by the first server. The method may include receiving, by the third server, a plurality of status updates from a plurality of servers that process the second service. The method may include selecting, by the third server, at least partially based on the plurality of status updates, a fourth server from the plurality of servers to process the second service using the processed media asset. Also, the method may include notifying, by the third server, the fourth server to process the second service using the processed media asset.

In some embodiments, a system for multi-server processing may be present. The system may include a kernel server system that is configured to: receive a first notification linked to a media asset from an ingest server system, determine a file replication service needs to be processed using the media asset, and notify, using a second notification, a file replication master server to have the file replication service processed using the media asset, wherein the first notification received by the kernel server system indicates that the ingest server system has received the media asset from a client. The system may include the ingest server, which is configured to: receive the media asset from the client, and send the notification to the kernel server system after receiving the media asset from the client. The system may include the file replication master server, wherein the file replication server is configured to receive the second notification from the kernel server system and determine at least one of a plurality of file replication servers to process the file replication service using the media asset.

BRIEF DESCRIPTION OF THE DRAWINGS

The present disclosure is described in conjunction with the appended figures.

Figure 1:
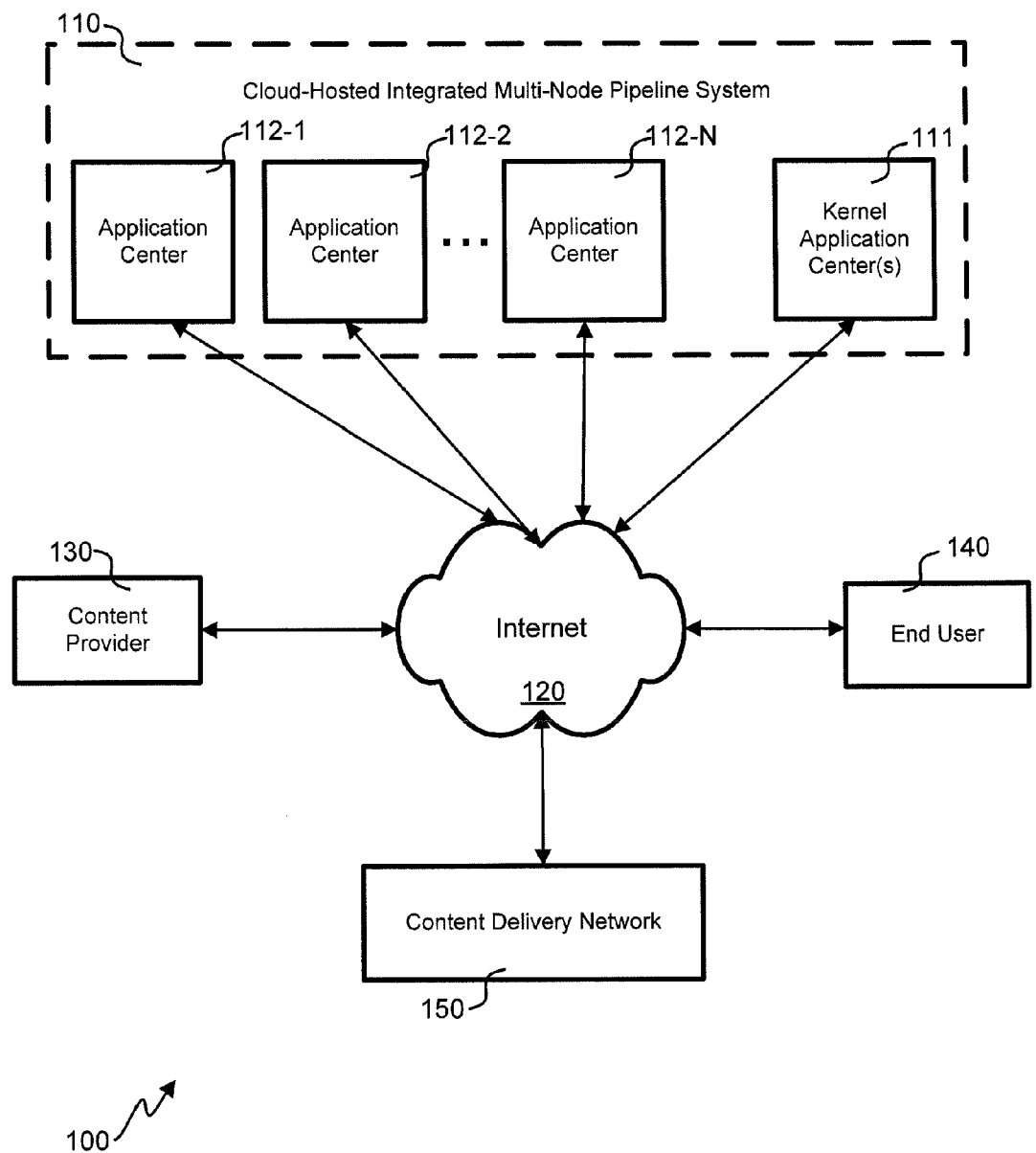
FIG. 1 illustrates a block diagram of a media servicing system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In a computing arrangement, rather than waiting for a first process to complete before starting a second process, it may be more efficient to allow various processes to be performed in parallel by multiple computing devices, such as servers, possibly located in different physical locations. Such an arrangement may involve a central computer coordinating various services to be performed by other computing devices. The central computer, possibly referred to as a kernel server, may not be aware of how to perform various processes or even an entire workflow of processes that needs to be performed on a particular piece of data. Rather, the kernel server may only be aware of what service needs to be performed next and/or in what order future services should be performed on the data.

The kernel server may then inform an appropriate server that a particular service needs to be processed using the data, which may be some form of a media file. Once the appropriate server has been notified as such, this server may process the service or assign another server to process the service. While the service is being processed, the kernel server may not need to process anything related to this service or data. Rather, the kernel server may direct other servers to perform the same or different services on the same or different pieces of data files.

Once the service has been processed using the data, the kernel server may be notified that the service has been completed. The kernel server may then determine another service, if any, that is to be processed using the data file. The kernel server may then inform the same or a different server to process this next service using the data (which may have been modified by the first service). Such a process may continue until all services necessary to be processed using the data have been completed.

While a kernel server may inform one or several servers to process various services using pieces of data, in some embodiments, vast numbers of pieces of data or data files may have services processed using them by a large number of geographically dispersed servers. Hence, such a system may be referred to as a pipelining system for massively parallel service. In some embodiments, a piece of data or data file may be a media asset, alternatively referred to as a media asset. This media asset may be a video and/or audio file. Further, this video or audio file may be large, possibly several megabytes or gigabytes in size. A media asset may be linked to a data object stored at another location. Such a data object may contain data linked to the media asset, such as a title, owner name, a universal resource locator linked to the media asset, and/or other data related to the media asset. Two possible services that may be processed using a media file may be transcoding, which may be the conversion of a media asset from one format to another, and transferring (which may be the making or copying of a media asset from one location to another).

For example, once an end user has uploaded a media asset, the kernel server may determine (or be notified) that the media asset needs to be transcoded into six different formats and transferred to fifteen servers scattered throughout the world. The kernel server may determine that the first service to be processed is transcoding the media asset. The kernel server may then notify another server, such as a master transcoding server, to process the transcoding. This may end the kernel server's involvement in the transcoding of the media asset. The kernel server may continue to process other tasks, such as determining how other media assets should be processed. The master transcoding server may then, in turn, notify one or more transcoding servers to transcode the media asset into the six different formats. The master transcoding server may assign one transcoding server to complete all of the transcoding or may split up the transcoding, such as by having six transcoding servers each transcode the media asset to one format. Whether one or multiple transcoding servers transcode the media asset may depend on how busy the transcoding servers are.

Following transcoding of the media asset being completed, the kernel server may be notified that some or all of the transcoding to the various formats has been completed. The kernel server may then determine the next appropriate service to be processed. This may involve the kernel server accessing a kernel workflow to determine the next appropriate service to be processed. Such a workflow may be a simplistic set of instructions that identifies what services should be performed on media assets under certain conditions. In this case, the service may be for the media asset (that has been transcoded into some other format(s)) to be transferred to one or more different servers. The kernel server may then notify a server, possibly a master file replication server, that the (transcoded) media asset needs to be transferred to various servers. This may again end the kernel server's involvement in the transferring of the media asset. The remaining steps of the media asset being transferred may be handled by the master file replication server and other file replication servers in communication with the master file replication server. The kernel server may be notified once some or all of the transferring of the various transcoded versions of the media asset have been completed.

Such an arrangement may allow the kernel server to only be responsible for determining what services need to be processed using media assets at particular times. As such, the kernel server may not need to know how to process any of the services. For example, if media assets are being transcoded to a new file format, the kernel server may be able to receive requests for the media asset to be transcoded to this particular format without knowing what needs to be done with the media asset to process the transcoding. Rather, the kernel server may inform a transcoding server or the master transcoding server as such and allow it to process the transcoding.

Further, such an arrangement may allow for a service to be quickly and efficiently scaled to match demand for that particular service. For example, if an increased number of media assets need to be transcoded, more transcoding servers may be added to the system, thereby allowing the kernel server (and, possibly a master transcoding server) to assign such servers to transcode media assets. Further, it may be possible to convert servers to perform different services. For example, a server that typically transfers media assets, such as by processing a file replication service, may be converted to be a transcoding server if the need arises.

Another advantage of such arrangements may be that if a particular service is taking a significant amount of time to complete, other services may continue to be processed unabated. For example, network congestion may slow down file replication servers processing transfers of media assets. However, such a slow down may not affect transcoding services because the transcoding is being handled by different servers.

As those with skill in the art will recognize, the previous example involving transcoding and transferring services being processed is not intended to be limiting. Servers or other computing devices in communication with a kernel server may process a variety of different services using media assets, or more generally, data files. For example, a similar arrangement of a kernel server and various other servers may be used to perform services on data files that are not media files.

Such a pipelining system for processing parallel services may be performed by a variety of different systems. Such a pipelining system may be part of a media servicing system. FIG. 1 is a block diagram illustrating a media servicing system 100, according to some embodiments of the present invention. The system can deliver media content to the end user 140 through a network such as the Internet 120. A media asset provided by a content provider 130 can be processed and indexed by cloud-hosted integrated multi-node pipelining system (CHIMPS) 110, and further stored on content delivery network (CDN) 150. Additionally or alternatively, the CHIMPS 110 may also be adapted to store the media asset.

The media servicing system further enables a content provider 130 or other entity to gather information regarding user behavior during media playback. For example, a content provider 130 can be provided with data indicating that end users tend to stop watching a video at a certain point in playback, or that users tended to follow links associated with certain advertisements displayed during playback. With this data, a content provider 130 can adjust factors such as media content, advertisement placement and content, etc., to increase revenue associated with the media content and provide the end user 140 with a more desirable playback experience.

End user 140 can request a media asset to hear and/or see with a client program running on a personal computer or other electronic device connected to Internet 120. The client program can be, for example, a media player, browser, or other application adapted to request and/or play media assets. In response to a request for a media asset, the CHIMPS 110 can utilize any number of application centers 112 and/or kernel application center(s) 111 to provide the client program with a data object concerning the requested media asset. The data object can include information about the media asset, including where the media asset can be located, such as within the CDN 150 or within the CHIMPS 150 itself. Location information may be provided by Universal Resource Indicator (URI), a Universal Resource Locator (URL) or other indicator. During playback of the media asset, the CHIMPS 150 can collect data regarding the playback through beaconing provided by a client program executed on a devices operated by the end user 140 and/or indexing service from within the CHIMPS and/or CDN. The CHIMPS 150 can subsequently provide the data and/or any analytics information derived from the data to the content provider 130.

Figure 2A:
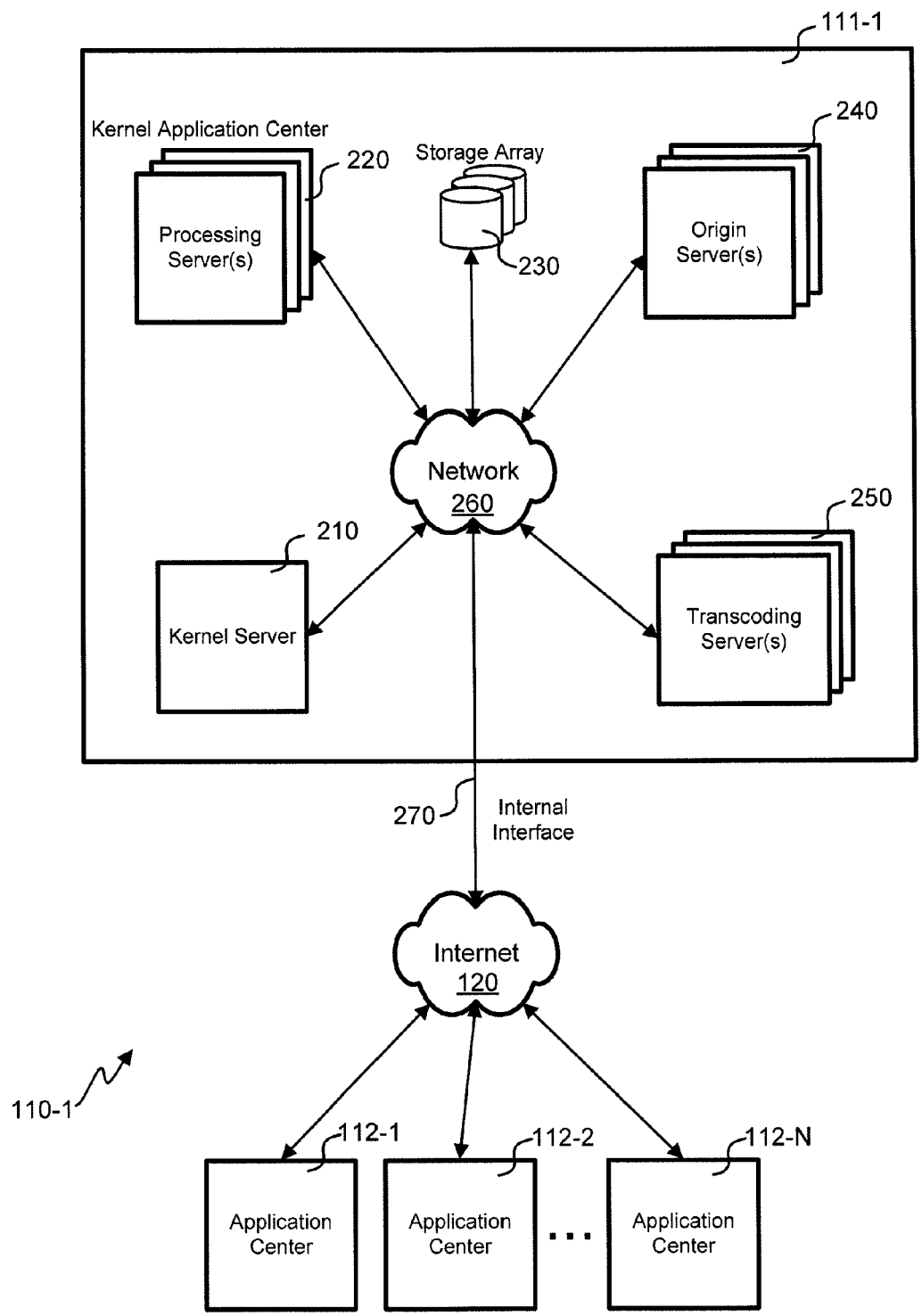
FIG. 2A illustrates a block diagram of an embodiment of a kernel application center connected with application centers.

FIG. 2A is a block diagram illustrating one embodiment of a kernel application 111-1 center connected with application centers from within the CHIMPS 110-1. The kernel application center 111-1 and application centers 112 can be geographically distant and can be connected via the Internet 120, wide area network (WAN), and/or other data communication network. Because application centers can be geographically separated, DNS services (not shown) can be used to allow an end user 140 to connect to the nearest available application center 112. The kernel application center 111-1 can connect with application centers 112 within the CHIMPS 110-1 through an internal interface 270, thereby enabling the application centers 112 access to the various components within the kernel application center 111-1.

Components within the kernel application center 111-1 can communicate through network 260, such as a local area network (LAN), and can include one or more origin servers 240 and a storage array 230 with which data objects and/or media assets may be stored and distributed. The storage array 230 may also be utilized by services running on processing server(s) 220 and/or transcoding server(s) 250 that may require temporary or long-term storage. Kernel server 210 can utilize processing server(s) 220, transcoding server(s) 250 to provide various functional capabilities to the CHIMPS 110.

For example, as described in more detail below, the CHIMPS 110-1 can provide transcoding service for media assets provided by a content provider 130 for syndication. Such a service can allow a content provider 130 to upload a media asset to an application center 112, after which the application center 112 would notify the kernel server 210 that the media asset has been uploaded. The kernel server can then notify services running on the processing server(s) 220 of the upload. These services can utilize transcoding server(s) to transcode the media asset, which can then be moved to a CDN and/or stored locally by storage array 230 and origin server(s) 240. Services running on the processing server(s) 220 can also update the associated data object stored by the storage array 230 and origin server(s) 240.

Figure 2B:
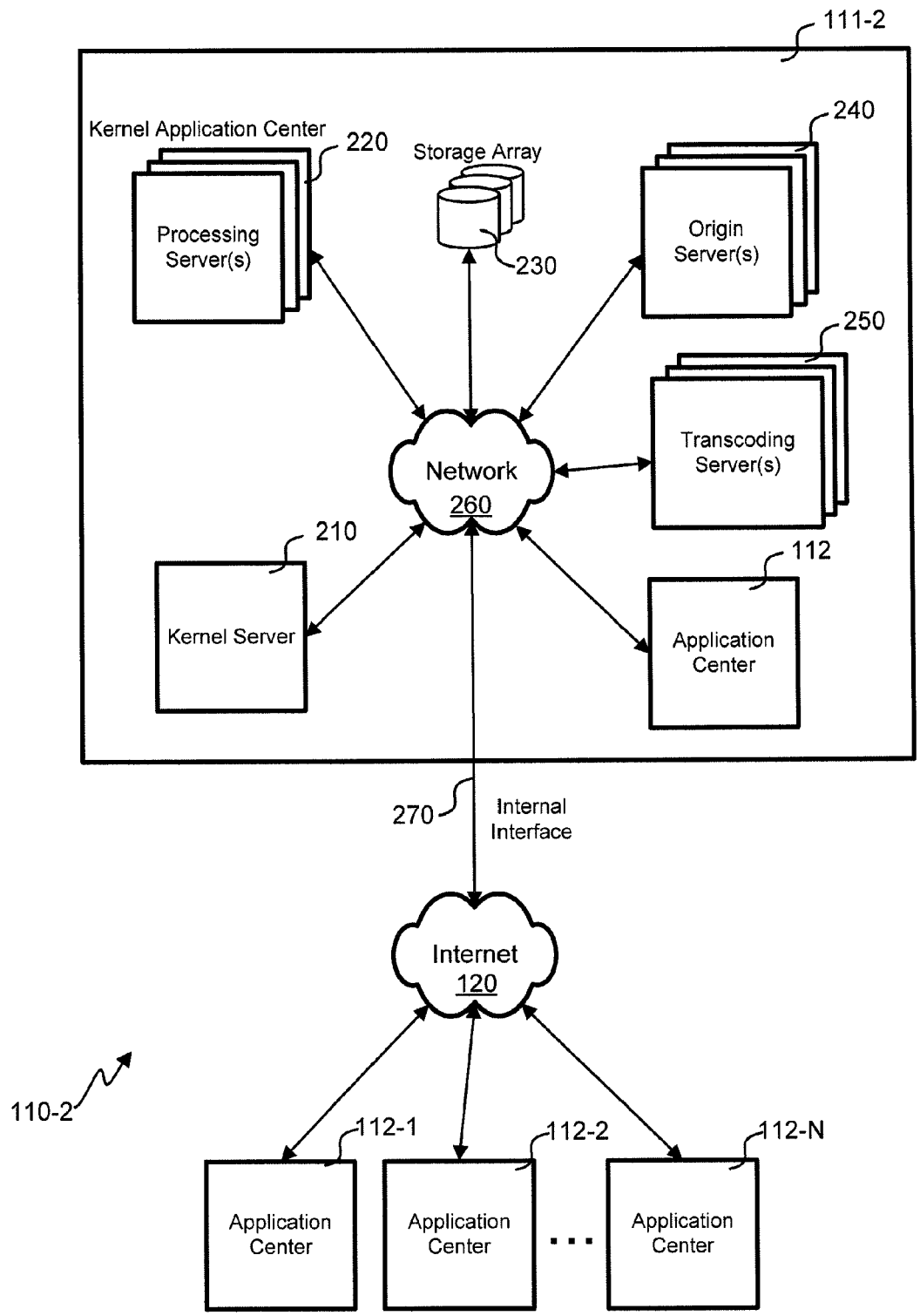
FIG. 2B illustrates a block diagram of an alternative embodiment of a kernel application center.

FIG. 2B is a block diagram illustrating an alternative embodiment of a kernel application center 111-2. In addition to the components of the embodiment of FIG. 2A, this embodiment incorporates an application center 112 within the kernel application center 111-2. The application center 112 incorporated within kernel application center 111-2 may be located at or near the other components of the kernel application center 111-2, and can be communicatively connected to the other components via network 260. The incorporated application center 112 can therefore have faster access to kernel application center functionality because it does not need to communicate over long distances. In consideration of this advantage, it will be understood that the CHIMPS 110 can include multiple kernel centers with one or more application centers incorporated therein. Additionally or alternatively, components of the kernel application center may be incorporated into one or more application centers 112 in the CHIMPS 110 to provide higher quicker access to certain functionality.

Figure 3:
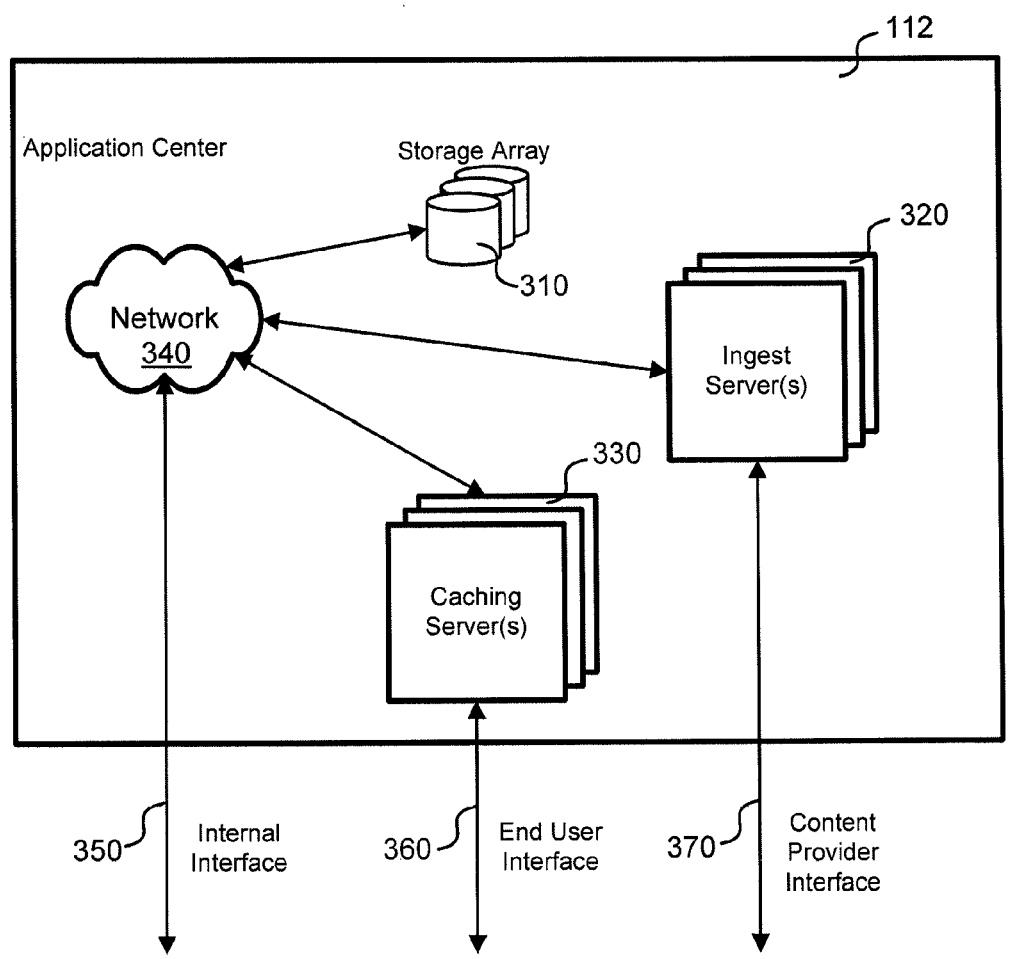
FIG. 3 illustrates a block diagram of an embodiment of an application center.

FIG. 3 is a block diagram illustrating an embodiment of an application center 112. The application center 112 can include caching server(s) 330 and a storage array 310 for storing and distributing data objects of media assets requested by end users through end user interface 360. Caching server(s) 330 and storage array 310 can also be used to collect, process, and/or store metrics information from beaconing data, media chunk requests, and/or other data sources, including data collected through end user interface 360. The application center can further include ingest server(s) 320 for ingesting uploaded media assets from a content provider 130 through a content provider interface 370. The media assets may be stored on the storage array 310. As with the kernel application center 111, the components of the application center 112 can be communicatively linked through a network 340, such as a LAN. The application center can further include an internal interface 350, providing a communication link from the application center to the rest of the CHIMPS. It is through internal interface 350, for example, that media assets stored on storage array 310 can be made available to a kernel application center 111 for services such as transcoding.

Figure 4A:
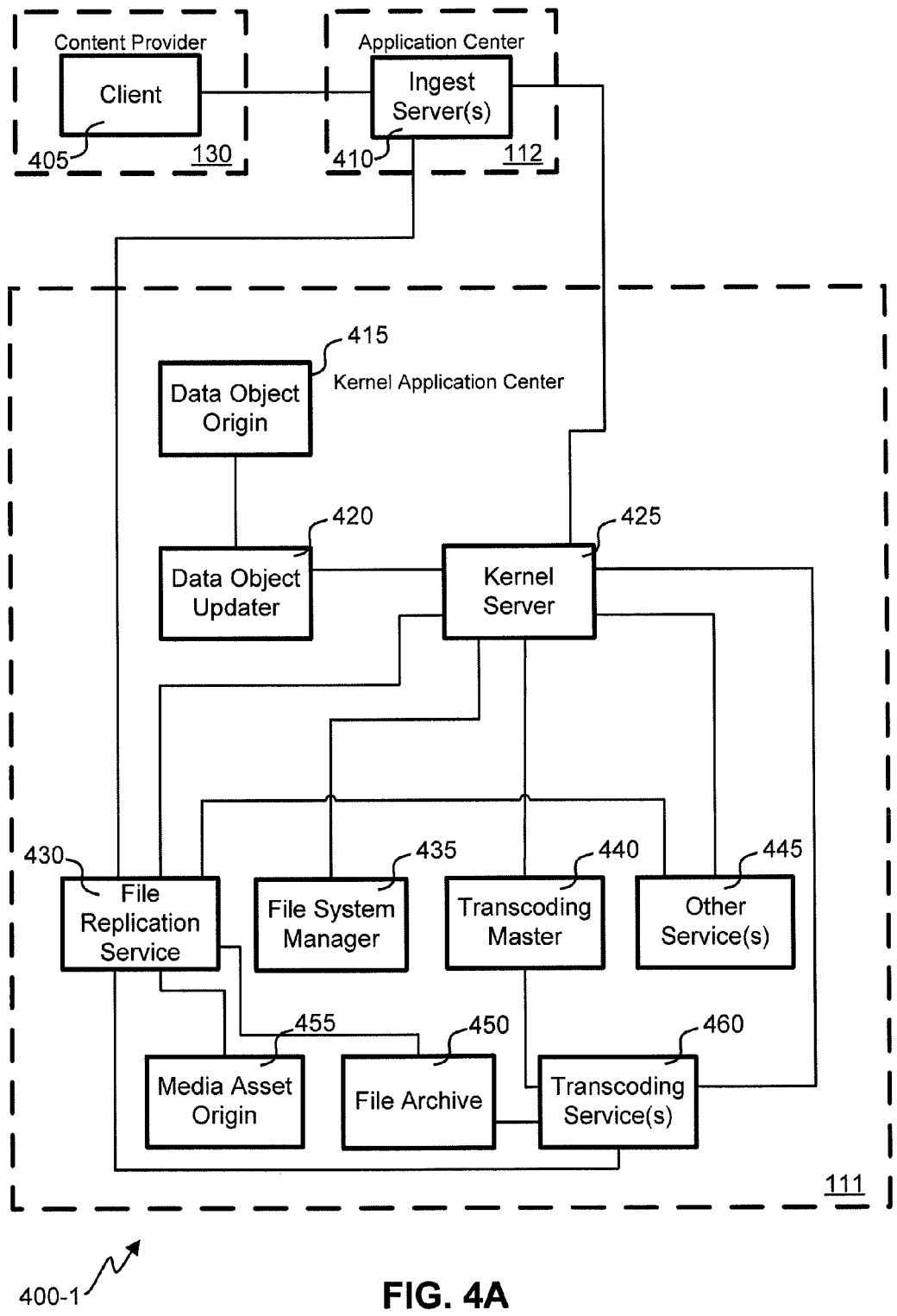
FIG. 4A illustrates a block diagram of processes and objects utilized by a cloud-hosted integrated multi-node pipelining system for media ingestion.

FIG. 4A is a block diagram 400-1 of processes and objects utilized by the CHIMPS 110 for media ingestion, according to some embodiments. Although FIG. 4A further indicates the physical systems in which it may execute or store these processes and objects, it will be understood that the processes and objects disclosed may be executed or stored on more than one system, including systems not disclosed in FIG. 4A. In other words, the processes and objects shown in FIG. 4A allow for a variety of implementations through one or more of hardware, software, firmware, microcode, etc.

Media can be ingested into the CHIMPS 110 when a content provider 130 uploads a media asset to ingest server(s) 410 in an application center 112 by utilizing a client 405. The client 405 can be a stand-alone application or browser based, for example, and can communicate with ingest server(s) 410 through an application programming interface (API) configured for the ingestion of media assets.

Ingest server(s) 410 can communicate with devices in the kernel application center 111 executing programs such as kernel server 425 and file replication service 430. The kernel server 425 can be configured to organize the workflow among services, such as transcoding 440 file system manager 435, and other services 445 (e.g., analytics, dynamic API, etc.) Upon a particular event, for example, the kernel server can be configured to notify the relevant services of the event, causing the services to process tasks associated with the event.

The file replication service 430, under direction of the kernel server 425, can coordinate the movement of the media assets between services. For example, retrieving the uploaded media asset from the ingest server(s) 410 and storing it on the file archive 450, or retrieving transcoded media assets from transcoding service(s) 460 and storing them in the media asset origin.

The data object updater 420 keeps the data object origin 415 up to date in response to any changes in the system. When, for example, a file is uploaded, transcoded, and stored in media asset origin 455, the location and other metadata concerning the transcoded media assets need to be created or updated in the data object origin 415 to ensure an end user who accesses the object in the data object origin 415 has the correct information regarding the related media asset. Because the data object updater 420 receives updates from the kernel server 425 (which is notified when a transcoded media asset is stored in the media asset origin 455, the system ensures the data objects in the data object origin are constantly up to date.

The upload of a media asset to the ingest server(s) 410, as described above, can provide an example of how the kernel server 425 may coordinate workflow. For instance, in response to the upload, the ingest server(s) 410 can notify the kernel server 425 that a media asset has been uploaded. The kernel server 425 informs the file replication service 430 of the uploaded media asset, and the file replication service 430 moves the uploaded media asset into the file archive 450 and notifies the kernel server 425 of the move. In response, the kernel server 425 notifies the file replication service 430, the file system manager 435, and the transcoding master 440 of the move. The file replication service 430 then will know it can delete the uploaded media asset from the ingest server(s) 410, the file system manager 435 will update the file system accordingly, and the transcoding master 440 will notify transcoding service(s) 460 of different transcoding tasks to be performed. The transcoding service(s) 460 can then retrieve the uploaded media asset from the file archive 450 to create transcoded media assets. The transcoding service(s) 460 notify the kernel server 425 once transcoding is complete, and the kernel server 425 relays this information to the file replication service 430. The file replication service 425 then takes the transcoded media assets from the transcoding services 460 and moves them to the media asset origin 455. Once the file replication service 430 notifies the kernel server 425 of the move, the kernel server 425, in turn, notifies the file replication service 430 and the data object updater 420. The data object updater 420 which updates the data object origin 415 accordingly, and the file replication service 430 deletes the transcoded media assets from the transcoding services 460.

The modular nature of the system enables all tasks associated with an event to be completed quickly. As illustrated in the example above, workflow relating to a particular event, such as a media asset upload, can be spread among the various services simultaneously. Moreover, because the system's modularity enables it to be scaled to accommodate differing hardware capacities, and because the system can be configured to dynamically allocate hardware to different services according to the needs of the system, the speed of completing tasks relating to a particular event can further be increased.

Figure 4B:
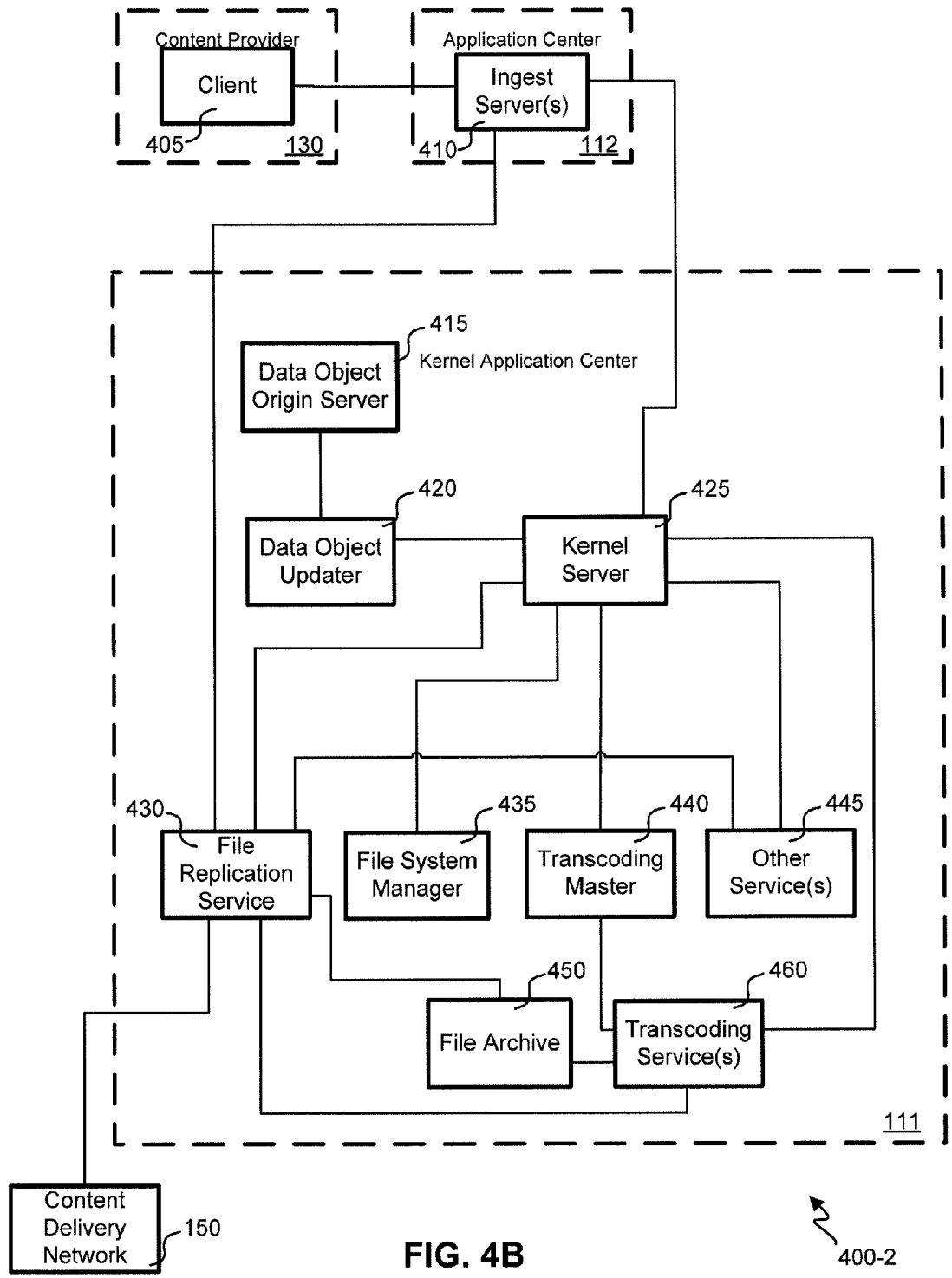
FIG. 4B illustrates a block diagram of processes and objects utilized by a cloud-hosted integrated multi-node pipelining system for media ingestion with a content delivery network.

FIG. 4B is a block diagram 400-2 of processes and objects utilized by the CHIMPS 110 for media ingestion, according to some embodiments. Block diagram 400-2 may be substantially similar to block diagram 400-1 except for the use of a content delivery network in place of media asset origin 455. Therefore, in block diagram 400-2, as opposed to the media assets being stored at media asset origin 455, they are stored at content delivery network 150, which may be operated and maintained by a third party.

Figure 4C:
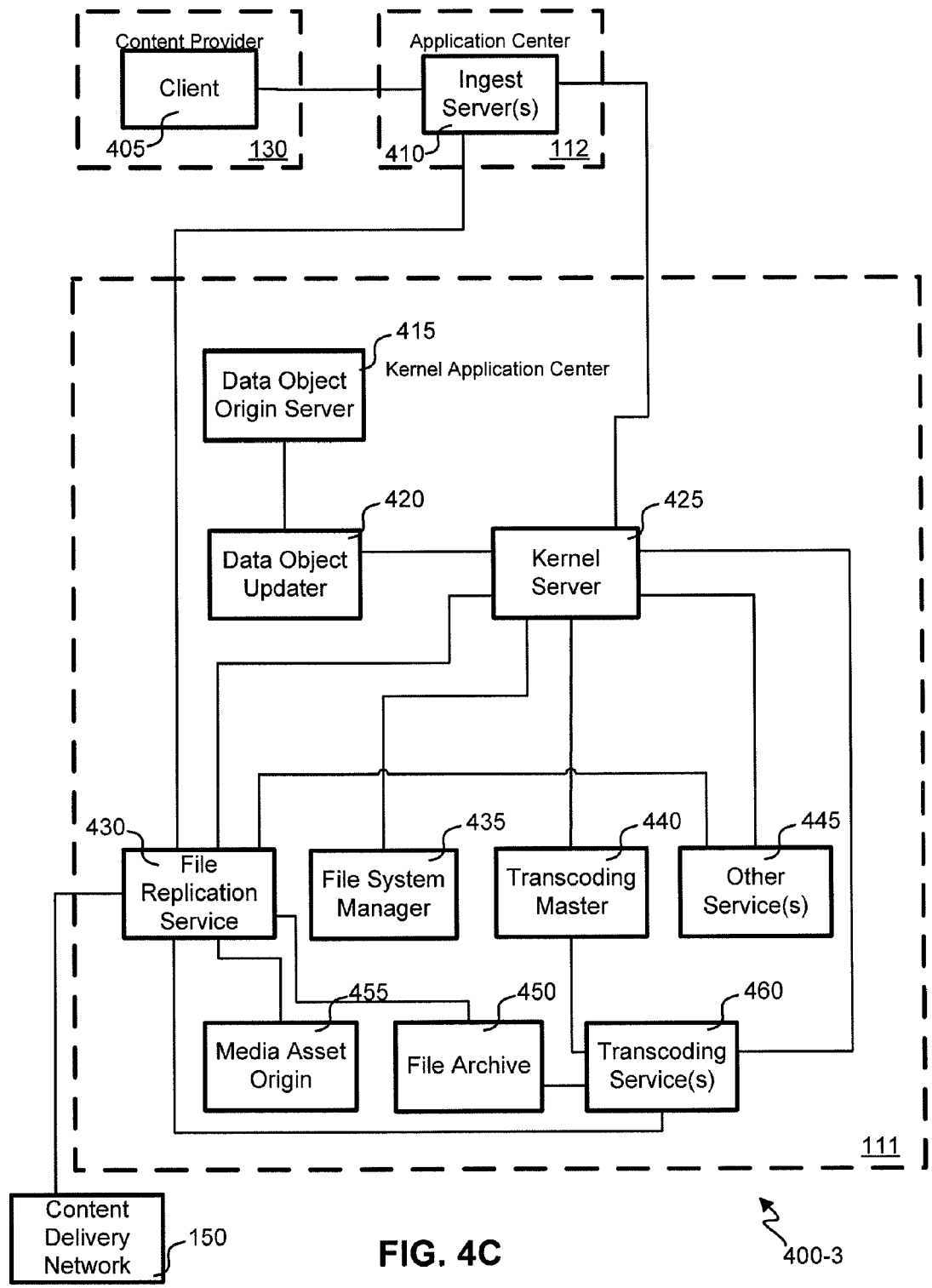
FIG. 4C illustrates another block diagram of processes and objects utilized by a cloud-hosted integrated multi-node pipelining system for media ingestion with a content delivery network.

FIG. 4C is a block diagram 400-3 of processes and objects utilized by the CHIMPS 110 for media ingestion, according to some embodiments. Block diagram 400-3 may be substantially similar to block diagram 400-1 except for the use of a content delivery network in conjunction with media asset origin 455. Here, in block diagram 400-3, media assets may reside at either media asset origin 455, content delivery network 150, or both.

Figure 5:
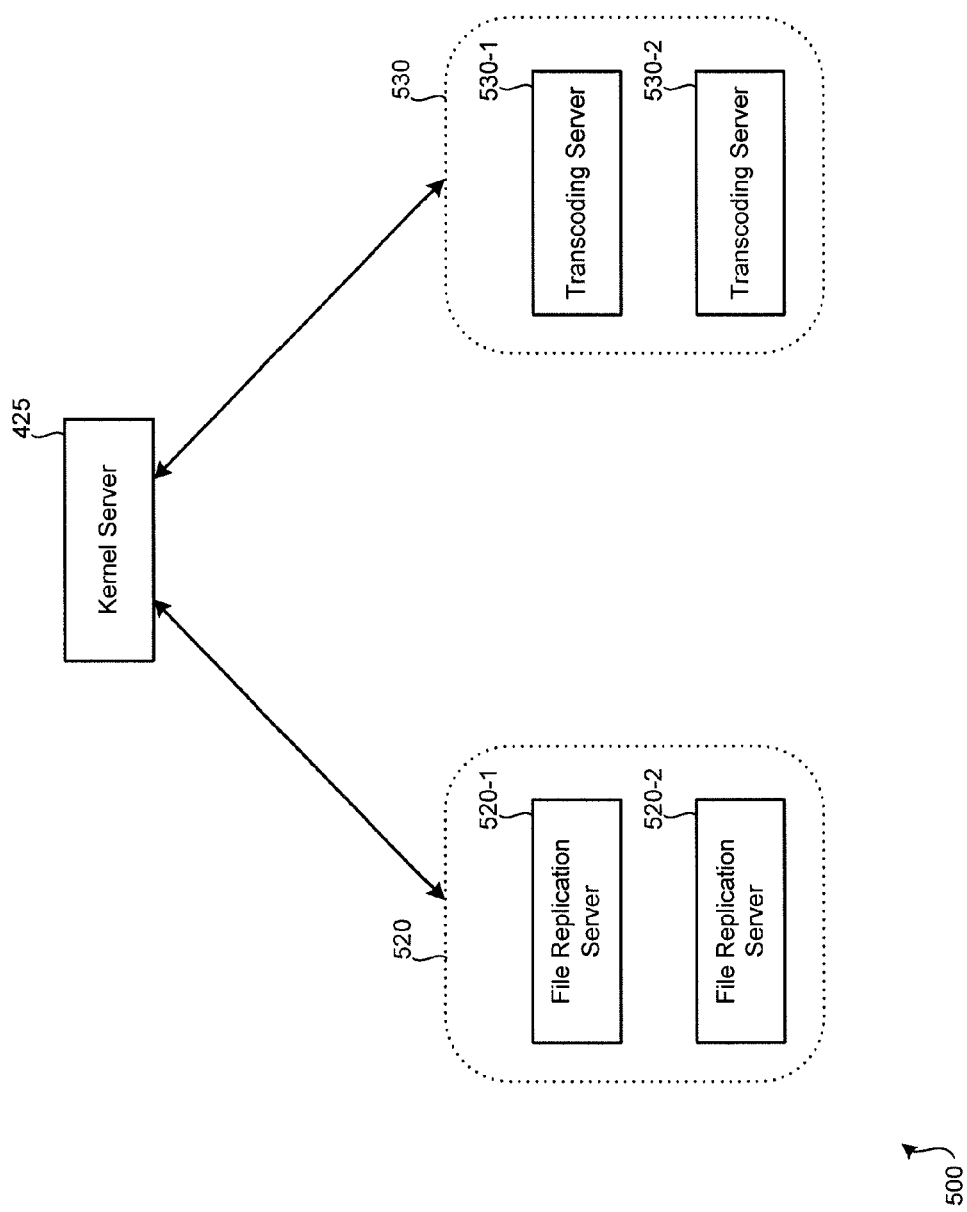
FIG. 5 illustrates a simplified embodiment of a system that allows for performance of services on media assets.

Specifically directed to embodiments of the pipelining system for processing parallel services, FIG. 5 illustrates an embodiment of a pipelining system 500 that may allow a kernel server to have other servers process services using a media asset. In some embodiments, system 500 includes a kernel server 425, a first group of servers 430 that performs a first service, and a second group of servers 460 that performs a second service.

Kernel server 425 may also represent kernel server 210 of FIG. 2 or kernel server 210 of FIG. 2B. Alternatively, kernel server 425 may represent some other kernel server. The kernel server 425 may determine what services need to be performed on media assets. For example, upon receiving a particular type of media asset, kernel server 425 may have instructions (possibly referred to as a kernel workflow) that indicate services to be processed using the media asset. In some embodiments, an end user may provide instructions to the kernel server that indicate what services should be processed using a media asset. For example, an end user may specify that a media asset should be transcoded to a particular file format. Kernel server 425 may be in communication with multiple groups of servers. These groups of servers may be dedicated to performing particular services.

Kernel server 425 may communicate with a first group of servers 520. The first group of servers 520 may be dedicated to performing a particular service, such as a file replication service. For example, first group of servers 520 may perform file replication service 430 of FIGS. 4A-4C. A file replication service may involve moving or copying media assets from a server to one or more other servers, possibly located in different geographic locations. The kernel server 425 may communicate with first group of servers 520 directly or via a network. Accordingly, first group of servers 520 may be physically local to kernel server 425 or may be geographically separated. If a network is used for communication between kernel server 425 and first group of servers 520, the network may be public, such as the Internet, or private, such as a corporate intranet or local area network. Besides a file replication service, first group of servers 520 may instead perform some other service.

First group of servers 520 is illustrated as including two file replication servers (520-1 and 520-2). This is for simplicity only. As those with skill in the art will understand, it may be possible for first group of servers 520 to include many more servers. The first group of servers 430 may receive a notification from kernel server 425 when a media asset is be processed by the file replication service. Such a notification may include an indication (possibly in the form of a universal resource indicator, such as a universal resource locator) of the location of the media asset. While the media asset may be stored with the kernel server 425 and/or may be transmitted to first group of servers 520 (such as at the time of the notification being sent), a media asset may also be stored at a remote storage server (such as file archive 450 of FIG. 4 or media asset origin 455).

Kernel server 425 may determine which file replication server of first group of servers 520 is to perform the file replication service on the media asset. In some embodiments, kernel server 425 may request a status notification from file replication server 520-1 and file replication server 520-2 to determine which one is available (or will be available sooner) to process the file replication service. Based on the results of the status notification, the kernel server 425 may send the request for the media asset to have the file replication service processed to a particular file replication server of first group of servers 520. In some embodiments, kernel server 425 may send the request for the media asset to have the file replication service performed to a queue. This queue may be accessed by first group of servers 520, thereby allowing the first file replication server (520-1 or 520-2) to become available to satisfy the request for the file replication service to be processed using the media asset.

Once the file replication service has been processed by first group of servers 520, the media asset may be modified or a new version of the media asset may have been created. Kernel server 425 may then be notified by the file replication server (520-1 or 520-2) that performed the file replication service on the media asset that the file replication service has been completed. The notification may also include an indication of where the new version or modified version of the media asset resides. If such an indication is present, it may be in the form of a universal resource indicator, such as a universal resource locator.

Once kernel server 425 has received a notification that file replication service has been processed using the media asset, kernel server 425 may determine if another service is to be processed using the media asset. If there is another service to be processed using the media asset, the kernel server 425 may then determine what service is to be processed. This next service to be performed on the media asset may be a transcoding service. Such a transcoding service may be performed by a second group of servers 530. While pipelining system 500 shows the second service as a transcoding service, other services may also be possible.

Second group of servers 530 may be a number of servers dedicated to performing the transcoding service on media assets. Referring to FIGS. 4A-4C, second group of servers 530 may represent a group of servers processing the transcoding service 460. Second group of servers 530 may also process some other service. Second group of servers 530 is illustrated as including two transcoding servers (530-1 and 530-2). This is for simplicity only. As those with skill in the art will understand, it may be possible for second group of servers 530 to include many more servers. Second group of servers 530 may receive a notification from kernel server 425 when a media asset is to have the transcoding service processed on it. Such a notification may include an indication of the location of the media asset. This media asset may have already been processed by another service, such as the file replication service. While the media asset may be stored with the kernel server 425 and/or may be transmitted to second group of servers 530, a media asset may also be stored at some remote storage server, such as those previously described. In some embodiments, a media asset is stored local to the server that is processing a service using the media asset.

As with first group of servers 520, kernel server 425 may determine which server of second group of servers 530 is to process the transcoding service using the media asset. In some embodiments, kernel server 425 may request a status notification from transcoding server 530-1 and transcoding server 530-2 to determine which one is available (or will be available sooner) to process the transcoding service. Based on the results of the status notification, the kernel server 425 may send the request for the media asset to have the transcoding service processed to a particular transcoding server of second group of servers 530. In some embodiments, kernel server 425 may send the request for the media asset to have the transcoding service processed to a queue. This queue may be accessed by second group of servers 530, thereby allowing the second service server 530-1 or 530-2 to become available to satisfy the request for the transcoding service to be processed using the media asset.

Following processing the media asset by the transcoding service by second group of servers 530, kernel server 425 may be notified by the transcoding server (530-1 or 530-2) that performed the transcoding service on the media asset that the transcoding service has been completed. The notification may also include an indication of where the media asset now resides. If such an indication is present, it may be in the form of a universal resource indicator, such as a universal resource locator.

Kernel server 425 may then determine if any other service is to be processed using the media asset. If not, pipelining system 500 may continue to process various other media assets. Such other media assets may also have been being processed concurrently while the media asset was being processed. For example, while either file replication server 520-1 or file replication server 520-2 was processing the media asset, the other file replication server (520-1 or 520-2) may have been processing some other media asset, transcoding server 530-1 may have been processing another media asset, and transcoding server 530-2 may have been processing yet another media asset. Further, kernel server 425 may have been sending notifications, receiving notifications, and making determinations as to what services need to be processed using other media assets at the same time as first group of servers 520 and second group of servers 530 were processing media assets.

While kernel server 425 may communicate directly with the file replication servers 520-1 and 520-2 and also with transcoding servers 530-1 and 530-2, in some embodiments, a kernel server may instead communicate with one or more master servers. In pipelining system 600 of FIG. 6, kernel server 425 communicates with master servers that coordinate the processing of media assets using various services. In pipelining system 600, kernel server 425 communicates with master file replication server 615 via network 640-1.

Network 640-1 may represent a public network, such as the Internet, or a private network, such as a corporate intranet or local area network. As those with skill in the art will recognize, it may also be possible for kernel server 425 to communicate directly with master file replication server 615, such as via a direct connection. In the illustrated embodiment of pipelining system 600, kernel server 425 communicates directly with master transcoding server 440.

Kernel server 425 may transmit a notification to master file replication server 615 that indicates a media asset that is to be processed by the file replication service. This notification may include a universal resource indicator that indicates where the media asset is located. The universal resource indicator may be in the form of a universal resource locator.

Master file replication server 615 may request a status update from some or all of the file replication servers in first group or servers 620. First group of servers 620 may send a response to master file replication server 615 indicating their individual availability. Based on the responses received from first group of servers 620, master file replication server 615 may assign one or more of file replication servers (620-1, 620-2, 620-3, or 620-4) to process the file replication service using the media asset. In some embodiments, master file replication service server 615 may randomly or in a predetermined pattern assign the media asset to have the file replication service processed using one of file replication servers 620-1, 620-2, 620-3, or 620-4. Master file replication server 615 is shown as communicating with first group of servers 620 via network 640-2. Network 640-2 may represent the same network as network 640-1, or may represent some other network. It should also be understood that master file replication server 615 may communicate with first group of servers 620 directly.

Once a file replication server of first group of servers 520 has processed the file replication service on the media asset, that file replication server may send a notification that the file replication service has been completed (or will be completed by some time) on the media asset to either master file replication server 615 or kernel server 425. If the notification is only sent to master file replication server 615, master file replication server 615 may transmit a similar notification that the file replication service has been processed using the media asset to kernel server 425.

As will be understood by those with skill in the art, while the first group of servers 620 illustrates four file replication servers (620-1, 620-2, 620-3, and 620-4), fewer or more first file replication servers may be present among first group of servers 620. For example, in some embodiments, the number of file replication servers in first group of servers 620 may be varied by adding or subtracting file replication servers. More file replication servers may be added if a large number of media assets require processing the file replication service. Similarly, if few media assets require the file replication service to be processed using them, some of the first group of servers 620 may be removed, shutdown, or assigned to another group of servers performing some other service.

A master transcoding server 640 may also be present. Master transcoding server 640 may represent the same server as transcoding master 440 of FIG. 4, or may represent some other server. Master transcoding server 640 may function similarly to master file replication server 615. Kernel server 425 may transmit a notification to master transcoding server 640 that indicates a media asset that is to have the transcoding service performed on it. This may be the same media asset that previously had the file replication performed on it. Therefore, this may be a modified or otherwise processed media asset. The notification may include a universal resource indicator that indicates where the media asset is located. The universal resource indicator may be in the form of a universal resource locator.

Master transcoding server 640 may request a status update from some or all of the second group of servers 630. The second group of servers 630 may send a response to master transcoding server 640 that indicates their individual availability. Based on the responses received from second group of servers 630, master transcoding server 640 may assign one or more servers of second group of servers 630 to process the transcoding service using the media asset. In some embodiments, master transcoding server 640 may randomly or in a predetermined pattern assign the media asset to have the file replication processed using it to a transcoding server of second group of servers 630. Master transcoding server 640 may assign the media asset to a transcoding server differently than master file replication server 615 assigns media asset to file replication servers 620.

Once a transcoding server (630-1, 630-2, 630-3, or 630-4) of second group of servers 530 has completed the transcoding using the media asset, that transcoding server may send a notification that the transcoding service has been completed on the media asset to either the master transcoding server 640 or kernel server 425. If the notification is sent only to master transcoding server 640, master transcoding server 640 may transmit a notification that the transcoding service has completed processing the media asset to kernel server 425.

As will be understood by those with skill in the art, while the second group of servers 630 illustrate four transcoding servers (630-1, 630-2, 630-3, and 630-4), fewer or more transcoding servers may be present among second group of servers 630. For example, in some embodiments, the number of servers in second group of servers 630 may be varied by adding or subtracting transcoding servers. More transcoding servers may be added if a large number of media assets need to be transcoded. Similarly, if few media assets require the transcoding service to be performed on them, some of second group of servers 630 may be removed, shutdown, or assigned to another group of servers performing some other service.

While pipelining system 600 refers to transcoding and file replication services, it should be understood that these are only examples of possible services that servers may perform. In some embodiments, the first group of servers 620 may process the transcoding service, and the second group of servers 630 may process the file replication service. Other services may be processed using media assets, or more generally, using data files. Additionally, it should be understood that the servers used in pipelining system 600 may be geographically distributed. As an example, kernel server 425 is illustrated in a first location 617. Master file replication server 615 may be in a second location 616. The second location 616 may represent a different building, city, state, country, or continent from first location 617. Master transcoding server 440 may be in a third location 618 with the second group of servers 630. This third location may represent a different building, city, state, country, or continent from first location 617 and second location 616. The first group of servers 620 may be in the same or different location from master file replication server 615. Further, individual file replication servers and transcoding servers may be located in different positions from other file replication servers and transcoding servers, respectively.

Figure 7:
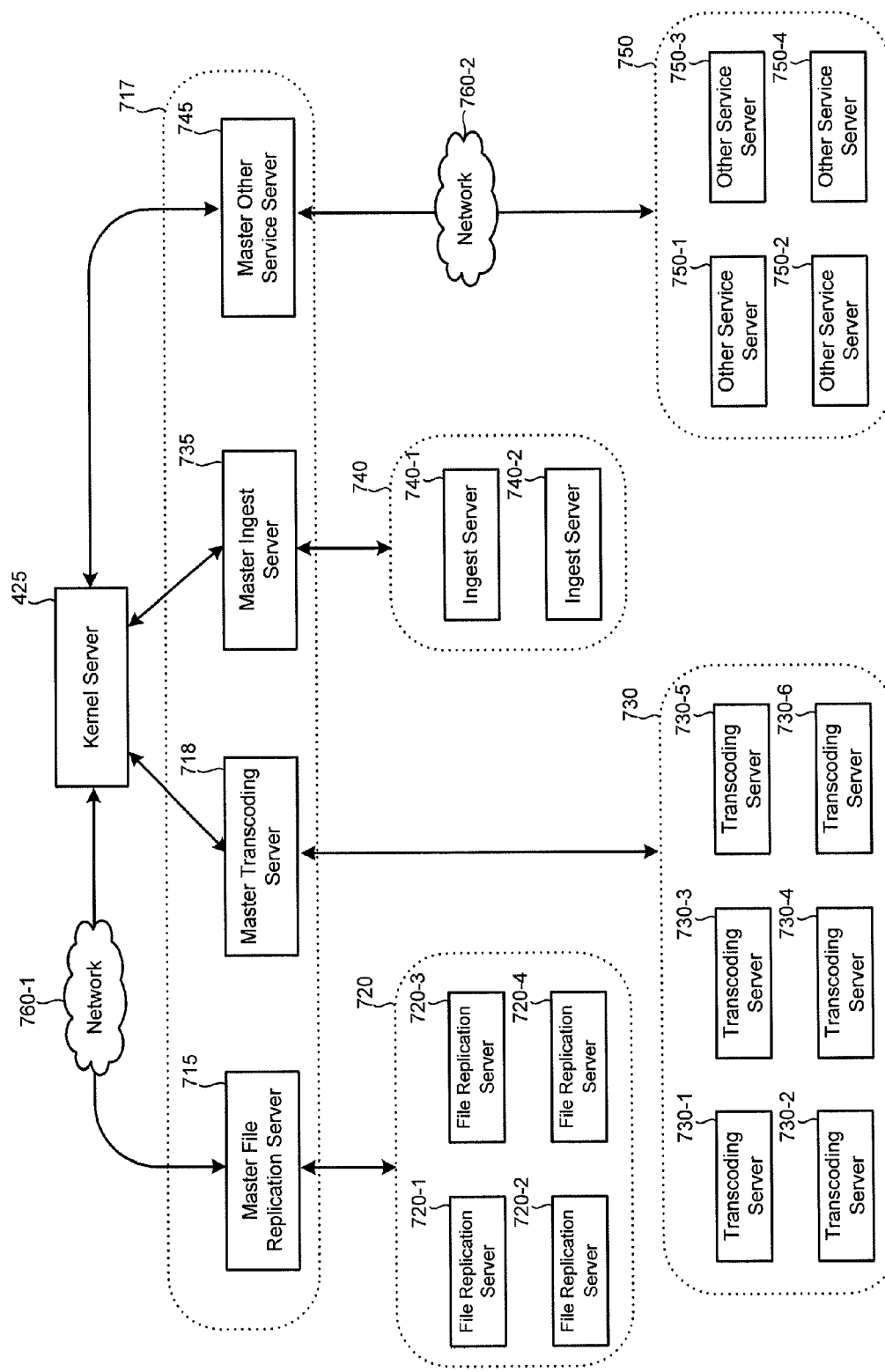
FIG. 7 illustrates another simplified embodiment of a system that allows for performance of services on media assets.

In some embodiments of a pipelining system 700 for performing parallel services on media assets more than two groups of servers configured to perform various services are present. FIG. 7 illustrates kernel server 425 interacting with four sets of servers configured to each process a service. Kernel server 425 communicates with master file replication server 715, master transcoding server 717, a master ingest server 735, and a master "other" service server 745. Kernel server 425 may communicate with some or all of master servers 717 via a network 760-1. In pipelining system 700, kernel server 425 is depicted as communicating only with master file replication server 715 via network 760-1. However, in some embodiments, some or all of master servers 717 may communicate with kernel server 425 via network 760-1 or some other network. Network 760-1 may represent a public network, such as the Internet, or a private network such as corporate intranet or local area network.

In pipelining system 700, the second group of servers 730 contains six transcoding servers. The second group of servers 730 may include an increased number transcoding servers (an addition of transcoding servers 730-5 and 730-6 over pipelining system 600) because a large number of media assets need to be transcoded.

In addition to the first group of servers 720 and the second group of servers 730, pipelining system 700 contains two other groups of servers controlled by master servers. A master ingest server 735 controls a third group of servers 740 comprised of ingest server 740-1 and ingest server 740-2. These ingest servers may perform the functions of ingest server 320 of FIG. 3. As illustrated, only two ingest servers are in the third group of servers 740. This may be because few media assets require ingesting. In some embodiments, it may be possible to convert a server processing a particular service to a server processing a different service. By way of example only, if the third group of servers 740 originally had four ingest servers, however not many media assets required ingesting, two of these ingest servers may have been converted to be transcoding servers (such as 730-5 and 730-6) because a large number of media assets required the transcoding service to be processed using them. Therefore, it may be possible to convert servers to perform a different service, and possibly convert those servers back to their original functionality if the need or desire arises. Further, if a server that is part of a group of servers, such as transcoding server 730-3 of second group of servers because unavailable for some reason (e.g., crashes), it may not adversely affect the rest of the system 700 because other servers are processing other media assets.

A fourth master server, master other service server 745, may interact with a fourth group of servers 750 through a network 760-2. This may be the same network as network 760-1, or may represent some other network. While only master other service server 745 is illustrated as communicating with a group of servers via a network, it should be understood that any of master servers 717 may communicate with a respective group of servers via network 760-2, or some other network. Fourth group of servers 750 may include four other service servers. These other service servers may represent the same servers as depicted by other services 445 of FIG. 4. Alternatively, the fourth group of servers 750 may refer to some other group of servers.

Figure 6:
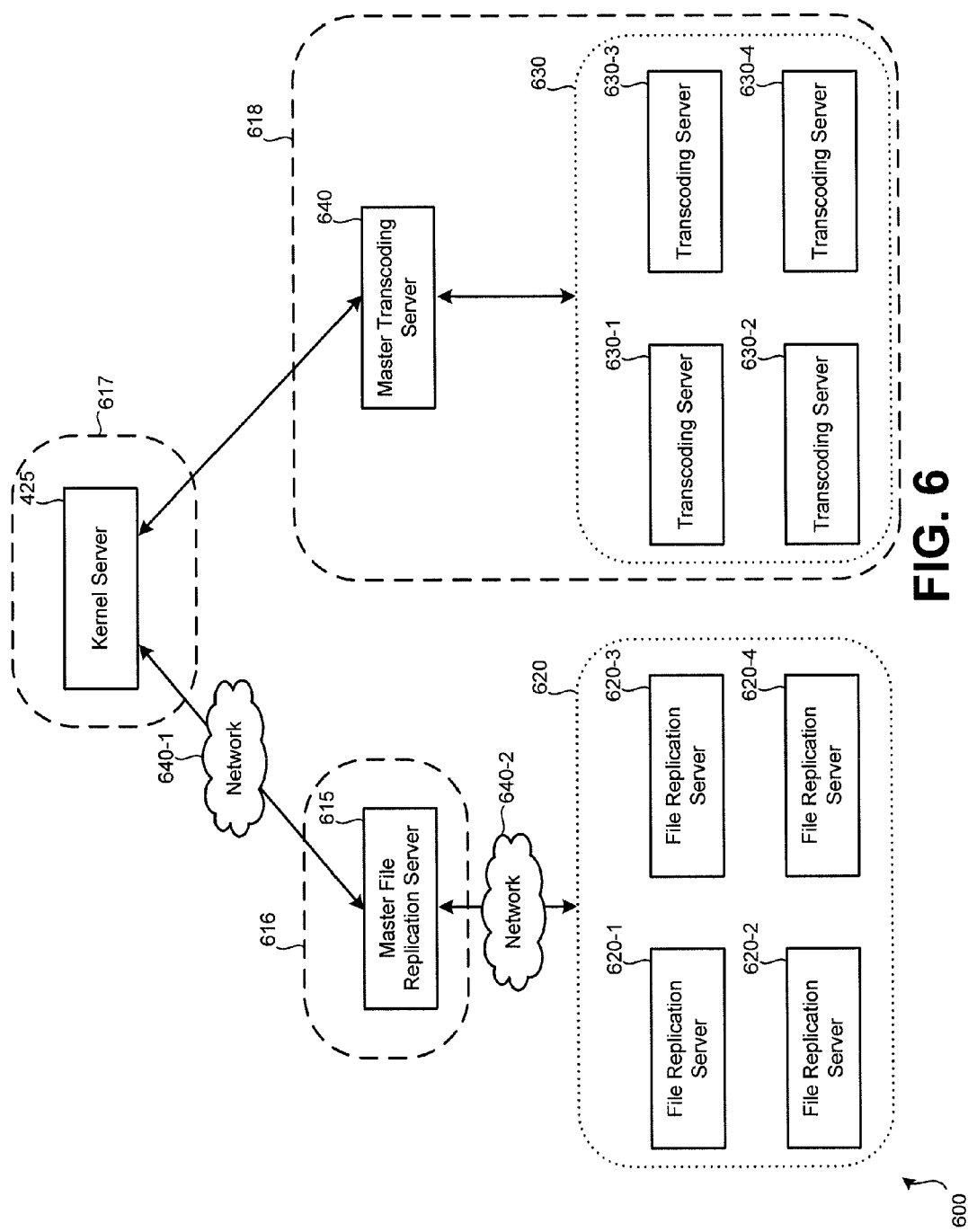
FIG. 6 illustrates another simplified embodiment of a system that allows for performance of services on media assets.

As was described in relation to pipelining system 600 of FIG. 6, it should be understood that the various servers of pipelining system 700 of FIG. 7 may be geographically scattered. For example, various master servers 717 may be located in different locations. Also, master servers 717 may or may not be located in the same physical location as the group of servers they control. Further, servers within groups of servers may also be located at disposed locations. For example, file replication server 720-1 may be located in a different geographic location than file replication server 720-2.

Figure 8:
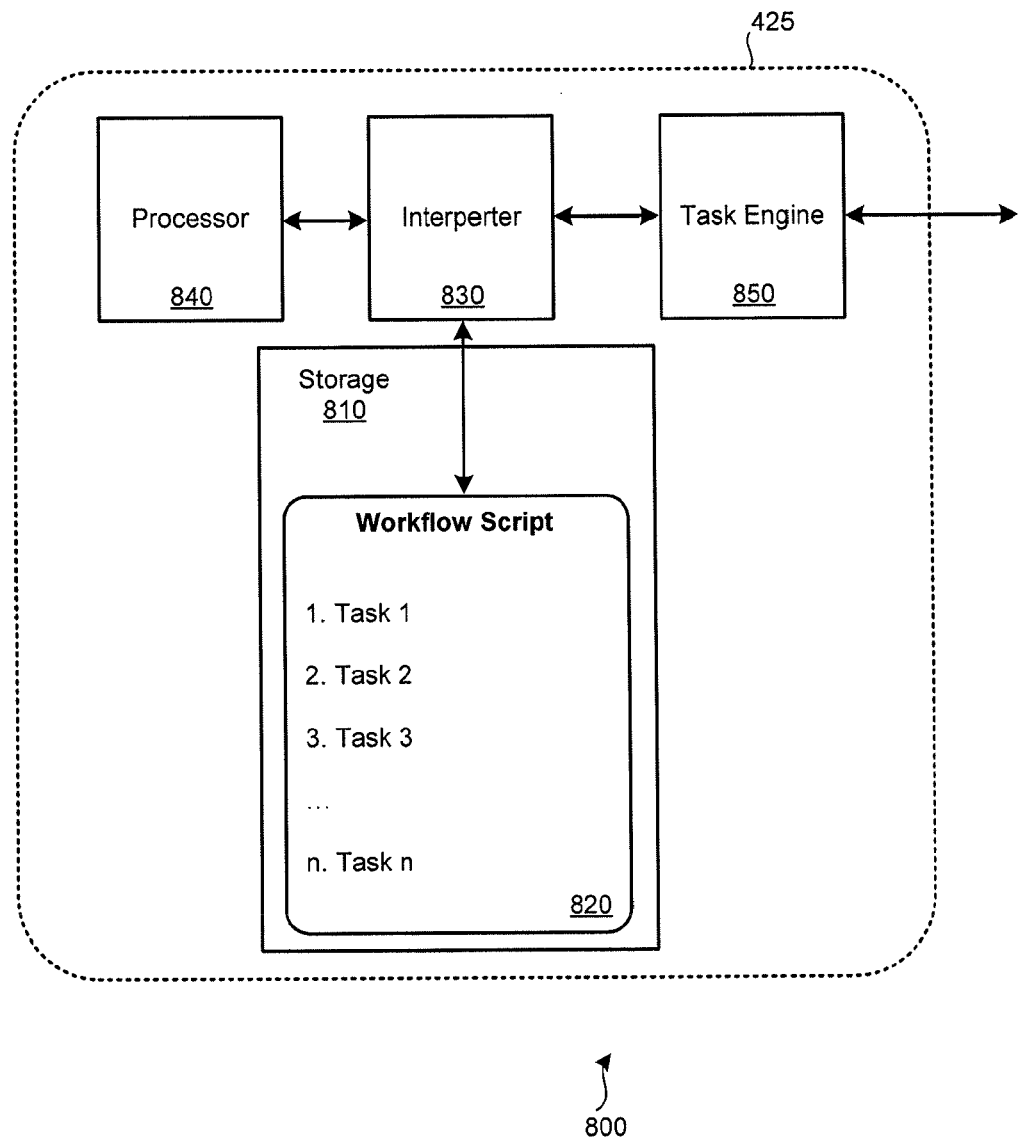
FIG. 8 illustrates a simplified block diagram of a kernel server.

In order for kernel server 425 to be able to determine what service is appropriate to process a media asset, it may have stored or otherwise have access to a workflow script. FIG. 8 illustrates a simplified block diagram of an embodiment 800 of kernel server 425. In some embodiments, kernel server 425 includes storage 810, interpreter 830, processor 840, and task engine 850. Storage 810 may represent various forms of tangible computer readable storage mediums, such as one or more hard drives or random access memory. Stored on storage 810 may be workflow script 820. While FIG. 8 illustrates workflow script 820 as stored by storage 810, it should be understood that workflow script 820 may be stored remote from kernel server 425 and accessible via a network connection.

Workflow script 820 may include a set of tasks that identify various subtasks that the kernel server should perform following receiving a notification. Workflow script 820 may identify various tasks (in FIG. 8, tasks 1 through n are present)

that are performed depending on the status of a media asset. For example, a particular task may be that if a file replication server notifies kernel server 425 that a media asset has been moved to a particular location, the kernel server 425 should notify master transcoding server 440 of FIG. 6 to process the transcoding service using the media asset. Workflow script 820 may be simplistic: each task may not identify how to perform various services, rather tasks may identify only what services need to be notified in particular situations. Based on this, kernel server 425 may notify the appropriate server to perform the appropriate service.

Notably, workflow script 820 may be modified whenever the order or type of service needed to be performed on a media asset changes. Because kernel server 425 may only receive notifications, determine another server to perform a service, and notify an appropriate server, significant flexibility may be provided in reworking workflow script 820 (or programming a new workflow script) for different services to be performed on media assets.

Further, different clients may use different workflow scripts. For example, a first client may wish for certain services to be performed on a media asset in a particular order. However, another client may require different services, or services in a different order, to be performed on its media assets. This may be accommodated by having different workflow scripts for different clients, or by having tasks that are only executed for particular customers. For example, the same notification received from a server performing a particular service may result in a different service being performed next, depending on the client.

Workflow scripts may also comprise basic programming. For example, if-then statements may be evaluated and executed in various tasks within workflow script 820. Each task of workflow script 820 may evaluate certain basic parameters received for a media asset. These parameters may include: what media asset is being evaluated, what client the media asset linked to, and what service has been performed on the media asset.

Below, an example workflow script is presented:

TABLE 1

| Task | Notification Received by Kernel Server | Service(s) to Perform | Other Service in Parallel? |
|---|---|---|---|
| Task 1 | Notification received from ingest server. | Notify (master) file replication server. | No |
| Task 2 | Notification received from (master) file replication server. | If transcoding required, then Notify (master) transcoding server. Otherwise perform task 3. | Other transcode services. |
| Task 3 | Notification received from (master) transcoding server. | Notify (master) file replication server to distribute processed media asset to media asset origin servers. | Yes. |
| Task 4 | Notification received from other service server. | Notify a first service and notify a second service. | — |

The above table illustrates an exemplary workflow script that may be executed by kernel server 425. For example, in task one, if a notification is received from an ingest server that a client has uploaded a new media asset, the kernel server 425 may notify a file replication server or master file replication server. The kernel server 425 may also send a link to the location of the media asset to the (master) file replication server. The kernel server 425 may also inform the file replication server where to copy or move the media asset to. In some embodiments, the file replication server may have its own workflow script that indicates that when a new media asset is identified by the kernel server, the media asset is to be transferred to a particular location. As another example from Table 1, task four informs the kernel server 425 that if a notification is received from some other service server (such as other service 445 of FIG. 4), a first and second service are to be performed on the media asset.

Various tasks may also identify whether or not some other service may be performed in parallel while the service identified by the task is being performed. For example, while the file replication service is being performed using the media asset, it may not be possible (or desirable) for another service to also be performed on the media asset. However, referring to task two, where a transcode service is being processed using the media asset, it may be possible for other transcode services to be processed using the same media asset. Also, referring to task three, while the media asset is being moved to an origin server, it may be possible for other services to be performed on the media asset. Whether a service may be performed in parallel may be determined by what the service does (e.g., whether the service modifies the media asset). For example, a service that modifies the media asset may not be possible to be performed while some other service is being performed, however a service that only copies a version of the media asset from one location to another may be possible to be performed.

Various tasks of workflow script 820 may be decoded and presented to processor 840 by interpreter 830. Processor 840 may inform task engine 850 via interpreter 830 of the service that needs to be performed. Task engine 850 may then transmit a notification to the appropriate server that performs the service. This notification may indicate the media asset that requires the service to be performed on it. The notification may also include other information, such as what client the service is to be performed for. The notification may also include a link, such as a universal resource indicator, that indicates the location the location of the media asset. Task engine 850 may also receive notification from servers performing services that indicate when the services are complete. Task engine may decode and relay the notification to processor 840 via interpreter 830. Processor 840 may then access workflow script 820 via interpreter 830 to determine the next appropriate service to be performed.

Figure 9:
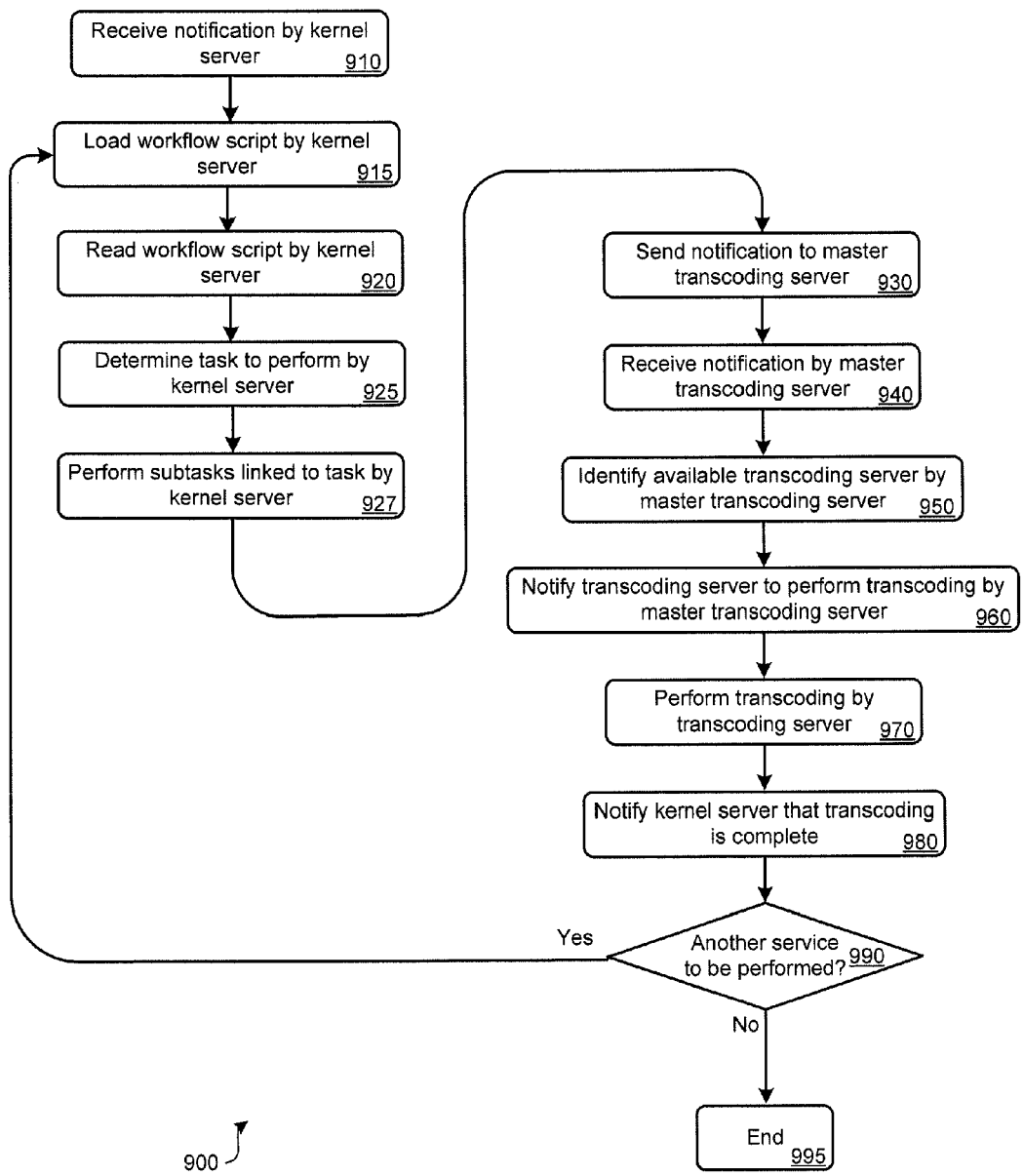
FIG. 9 illustrates an embodiment of a method for performance of services on media assets.

FIG. 9 illustrates an embodiment of a method 900 that may be performed using a pipelining system such as pipelining system 500, pipelining system 600, or pipelining system 700. Further, it may be possible to perform method 900 using some other pipelining system. At block 910, a kernel server (such as kernel server 425 of FIGS. 5-8) may receive a notification from a server processing a particular service using a media asset. For example, an ingest server (such as 740-1 of FIG. 7) may notify the kernel server that a media asset has been uploaded by a client. This notification may include a link to the media asset, such as a universal resource indicator.

At block 915, a workflow script, possibly particular to the client who uploaded the media asset, may be loaded by the kernel server. At block 920, the workflow script may be read by the kernel server. At block 925, the appropriate task to be performed by the kernel server. Alternatively, the notification received by the kernel server from the ingest server (or some server sending the notification on behalf of the ingest server) at block 910 may contain an indication that instructs the kernel server what service needs to be processed using the media asset. At block 927, the kernel server may perform various subtasks related to the task identified at block 925, such as evaluating if-then statement, and determining if some other service may be performed in parallel. The remainder of method 900 uses a transcoding service as an exemplary service to be processed using the media asset.

Whether the kernel server determines transcoding is the appropriate service to perform by consulting a workflow script or is notified of such by the ingest server, the kernel server may send a notification to a master transcoding server (such as 440 of FIG. 7) that coordinates performance of the transcoding service at block 930. This notification may include a link, such as a universal resource indicator, to the media asset that is to be transcoded being transmitted to master transcoding server.

At block 940, the notification transmitted by the kernel server may be received by the master transcoding server. In some embodiments, the master transcoding server may identify one or more transcoding servers available to process the transcoding service using the media asset at block 950. This may involve the master transcoding server sending a request for a status update from one or more of the transcoding servers (such as transcoding servers 730-1, 730-2, 730-3, 730-4, 730-5, and 730-6 of FIG. 7). The transcoding servers may respond to indicate whether or not they are available to process the transcoding service and/or may indicate when they will become available to process the transcoding service. Based on the status updates, the master transcoding server may determine one or more transcoding servers to process the transcoding service using the media asset. In some embodiments, as opposed to requesting and receiving a status update from each transcoding server, the master transfer server may assign media assets to be transcoded to each transcoding server based on a predetermined pattern or in a random pattern.

At block 960, the one or more transcoding servers that were selected to process the transcoding service may be notified by the master transcoding server. This notification may include a link (such as a universal resource indicator, or, more specifically, a universal resource locator) to the media asset. If the transcoding server is currently busy, no further action may be performed until the transcoding server becomes available. Then, at block 970, the transcoding server may process the media asset. This may involve the transcoding server modifying the media asset and/or creating one or more new versions of the media asset.

Once the (one or more) transcoding servers have completed processing the transcoding service on the media asset, the kernel server may be notified that the transcoding service is complete at block 980. This may involve the transcoding server notifying the kernel server directly. Alternatively, in some embodiments, the transcoding server may notify the master transcoding server that the transcoding service is completed. Then, the master transcoding server may inform the kernel server that the transcoding service has completed.

The kernel server may then determine whether another service is to be processed on any of the versions of the media asset at block 990. If no more services are to be performed on or using any of the versions of the media asset, the method may conclude at block 995. At this point, one or more of the versions of the media asset may be stored in some location, such as file archive 450 or media asset origin 455. However, returning to block 990, if another service is to be performed, the method may return to block 920 and the kernel server may determine what next service should be performed using one or more of the versions of the media asset.

While method 900 refers to a transcoding service being performed, it should be understood that the references to a transcoding service are for or example purposes only. Any other of the previous services described may also be performed using such a method on the media asset. Alternatively, it may be possible to conduct services not discussed on the media asset. Even more generally, as opposed to a media asset being processed and/or modified using method 800, some other form of data or data file may instead be used.

Further, it should be appreciated that while method 900 is being performed, the kernel server may be receiving notifications and sending notifications as to various services being processed using other media assets. For example, a similar method to method 900 may be used for thousands of other media assets involving the kernel server at the same time. In such a way, a single kernel server may be able to coordinate various services being performed on vast numbers of media assets at the same time.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A content processing system for performing processing of multiple services using a media asset, the content processing system comprising:
a first server system, which is configured to:
receive a notification from a second server system, wherein the notification is linked to the media asset,
select a workflow script from a plurality of stored workflow scripts, wherein:
the workflow script is particular to a client that provided the media asset to the content processing system;
load the workflow script;
determine a second service to be processed using the media asset, wherein:
the second service is at least partially determined by the first server system using the workflow script and a task;
the workflow script comprises a plurality of tasks;
the task is part of the plurality of tasks;
each task of the plurality of tasks identifies one or more services to be processed using media assets; and
the task of the plurality of tasks of the workflow script indicates that the second service is to be processed using the media asset;
determine a third server system to process the second service, notify the third server system to process the second service, wherein:
the notification indicates that the second server system has processed a first service using the media asset; and
communicate with a data object updater that is configured to update a data object linked with the media asset, wherein:
the media asset is stored separately from the data object; and
the data object comprises:
metadata linked with the media asset; and
a link to the media asset;
the second server system, which is configured to:
function as part of a first group of servers performing the first service;
be converted to function in another group of servers performing another service, and
send the notification to the first server system that indicates when the first service using the media asset is complete; and
a third server system configured to:
function as part of a second group of servers performing the second service;
be converted to function in another group of server performing another service;
process a second service using the media asset; and
notify the first server system when the second service has been processed.

2. The content processing system for performing processing of multiple services using the media asset of claim 1, wherein the first service is a transcoding service that converts the media asset from a first format to a second format and the workflow script indicates that multiple transcoding services are permitted to be performed in parallel.

3. The content processing system for performing processing of multiple services using the media asset of claim 2, wherein the second service is a file replication service that transfers a copy of the media asset to a fourth server system.

4. The content processing system for performing processing of multiple services using the media asset of claim 3, wherein the fourth server system is a content delivery network.

5. The content processing system for performing processing of multiple services using the media asset of claim 1, wherein the first server system, second server system, and third server system are three physically distinct server systems.

6. The content processing system for performing processing of multiple services using the media asset of claim 1, wherein:
the second server is configured to process only the first service; the third server is configured to process only the second service; and the first service and the second service are different services.

7. The content processing system for performing processing of multiple services using the media asset of claim 1, wherein the first server is configured to perform additional determinations and notifications linked to other media assets while the third server is processing the second service using the media asset.

8. The content processing system for performing processing of multiple services using the media asset of claim 1, wherein the third server system is comprised of multiple servers and a master server, the third server system is further configured to:
receive, by the master server, the notification from the first server;
receive, by the master server, statuses from at least some of the multiple servers; and
determine, by the master server, at least partially based on the statuses received from at least some of the multiple servers, which of the multiple servers will process the second service using the media asset.

9. The content processing system for performing processing of multiple services using the media asset of claim 8, wherein each of the multiple servers of the third server system has a queue configured to determine an order of media assets on which to perform the second service.

10. A method for processing multiple services using a media asset, the method comprising:
receiving, at a first server, a notification, wherein:
the notification indicates that a first service processed using the media asset has been completed by a second server, and
the performance of the first service results in a processed media asset being created;
selecting, by the first server, a workflow script from a plurality of stored workflow scripts, wherein the workflow script is particular to a client that provided the media asset;
loading, by the first server, the workflow script;
determining, by the first server, a second service to be processed using the processed media asset, wherein:
the second service is at least partially determined by the first server using the workflow script and a task; and
the workflow script comprises a plurality of tasks;
each of the plurality of tasks identifies one or more services to be processed using media assets;
the task, of the plurality of tasks, indicates that the second service is to be processed using the processed media asset;

transmitting, by the first server, a notification to a third server responsible for processing the second service using the processed media asset, wherein:
 the notification indicates that the second service is to be processed using the processed media asset;
 the third server is configured to function as part of a first group of servers each performing the second service; and
 the third server is configured to be converted to function in another group of servers performing another type of service;
updating, by the first server, via a data object updater, a data object linked with the media asset, wherein:
 the media asset is stored separately from the data object; and
 the data object comprises:
  metadata linked with the media asset; and
  a link to the media asset;
receiving, by the third server, the notification transmitted by the first server;
receiving, by the third server, a plurality of status updates from a plurality of servers that process the second service;
selecting, by the third server, at least partially based on the plurality of status updates, a fourth server from the plurality of servers to process the second service using the processed media asset; and
notifying, by the third server, the fourth server to process the second service using the processed media asset.

11. The method for processing multiple services using the media asset of claim 10, further comprising placing, by the third server, an indication in a queue until the third server is available to process the second service using the media asset, wherein the indication is linked to the modified media asset.

12. The method for processing multiple services using the media asset of claim 10, wherein the first server is configured to perform additional determinations and transmit additional notifications while the second service is being processed using the media asset.

13. The method for processing multiple services using the media asset of claim 10, wherein the plurality of servers are servers for transcoding media assets into various formats.

14. The method for processing multiple services using the media asset of claim 10, wherein the second server is configured to receive an upload of the media asset from a client.

15. The method for processing multiple services using the media asset of claim 10, further comprising:
 receiving, by the first server, a second notification that the fourth server has completed the second service using the media asset;
 determining, by the first server, a third service to be processed using the media asset; and transmitting, by the first server, a notification to a fifth server responsible for having the third service processed using the media asset.

* * * * *